F. STANLEY.
AUTOMOBILE LOCK.
APPLICATION FILED OCT. 4, 1920.
1,385,479.
Patented July 26, 1921.
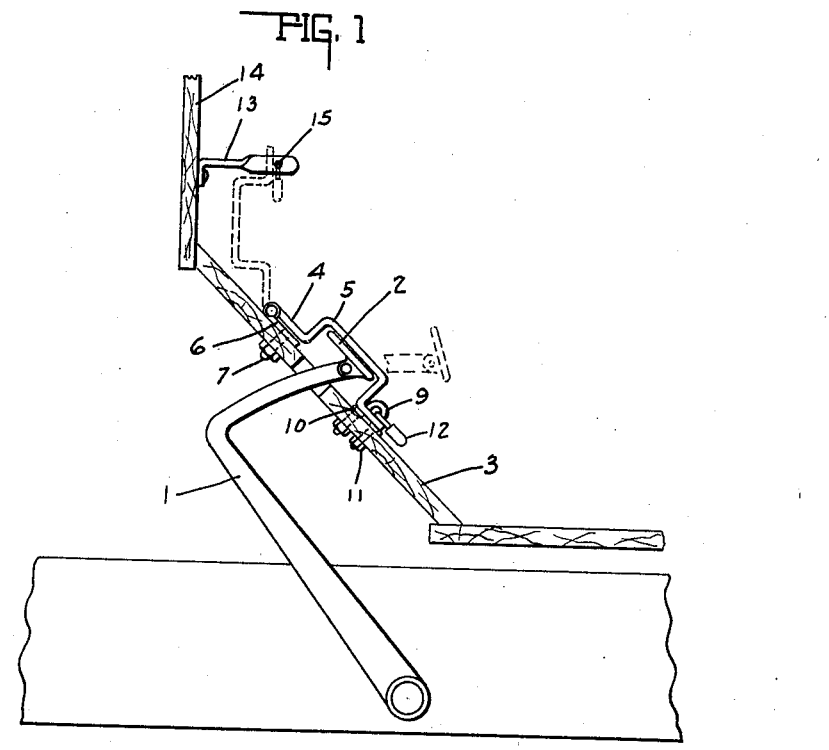
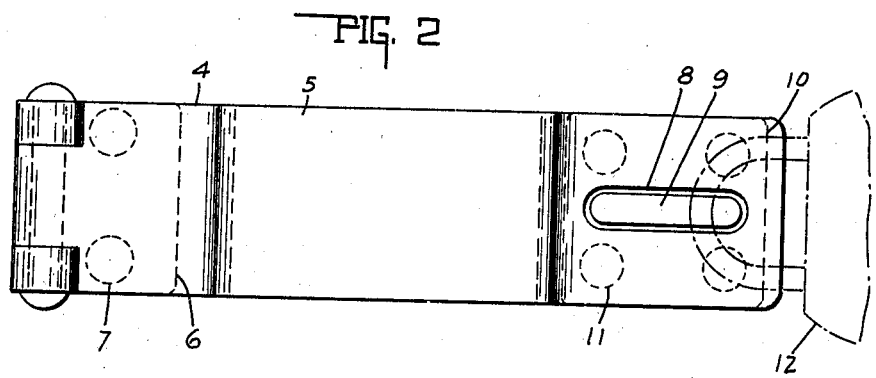
INVENTOR.
FRANK STANLEY.
BY
ATTORNEY.

UNITED STATES PATENT OFFICE.

FRANK STANLEY, OF NEWCASTLE, INDIANA.

AUTOMOBILE-LOCK.

1,385,479. Specification of Letters Patent. Patented July 26, 1921.

Application filed October 4, 1920. Serial No. 414,476.

*To all whom it may concern:*

Be it known that I, FRANK STANLEY, a citizen of the United States, residing at Newcastle, in the county of Henry and State of Indiana, have invented certain new and useful Improvements in Automobile-Locks, of which the following is a specification.

This invention relates to automobile locks, and the prime feature of the invention is the provision of means for locking the clutch operating lever so that it will be impossible to throw the clutch into operation after the foot lever has been lowered.

A further feature of the invention is in so mounting the locking mechanism that the securing means therefor are covered over when in locking position.

A further feature of the invention is the provision of means for holding the locking mechanism out of the path of the operating parts of the car when the locking mechanism is not in use.

Other objects and advantages will be hereinafter more fully set forth and pointed out in the accompanying specification.

In the accompanying drawings which are made a part of this application.

Figure 1 is a fragmentary sectional view through the front portion of an automobile showing the clutch operating foot lever in locked position in full lines and the parts in unlocked position by dotted lines, and Fig. 2 is an enlarged top plan view of the locking mechanism when in locked position.

Referring to the drawings, 1 indicates the foot lever of an automobile, such as is used for throwing the clutch of the automobile into and out of operative position, the tread portion 2 of the foot lever extending through the foot board 3 of the automobile, as is usual in devices of this class.

In disconnecting the motor of an automobile from the driving parts thereof, the foot lever 1 is depressed, as shown in full lines in Fig. 1, and while so depressed it is impossible to drive the automobile as the power of the engine is disconnected from the driving mechanism, and to guard against any one not entitled to operate the car connecting the motor with the driving mechanism, a latch 4 is provided, said latch having an upwardly bowed portion 5 between its ends which fit over the tread portion 2 of the foot lever when the foot lever is in its lowered position, the upper end of the locking latch being pivoted to a plate 6 which is in turn bolted to the foot board 3, the plate being so arranged that when the latch is in its lowered position the bolts 7 employed for holding the plate on the foot board are covered over. The opposite end of the locking latch is provided with a slot 8 which passes over a staple 9 carried by a keeper 10, said keeper being also secured to the foot board 3 by bolts 11, the end of the latch likewise covering the ends of these bolts to prevent said bolts from being removed when the latch is in locked position. The latch 4 is secured in its locked position by entering any suitable form of lock 12 through the staple 9.

When the locking latch is not in use it is swung upwardly, as shown by dotted lines in Fig. 1, and engaged with a bracket 13 attached to the dash 14 of the car, said bracket having an opening 15 therethrough through which the shank of the lock is to be entered for holding the latch in its elevated position and entirely out of the road of the operating parts of the car.

This device can be very cheaply manufactured and readily installed in use and will guard against any one driving away with the automobile so long as the latch is in locked position over the clutch operating lever. It will likewise be seen that the locking mechanism may be quickly applied to use or restored to its unlocked position as it will require but a moment to release the lock and move the latch to its operative or inoperative position.

Having thus fully described my said invention, what I claim as new and desire to secure by Letters Patent, is:

1. The combination with the foot lever of an automobile, of a latch for locking said foot lever against operation, said latch having an upwardly bowed portion between its ends for fitting over the end of the foot lever and having a slot in one end thereof, a plate attached to parts of the automobile, means for hinging one end of the latch to said plate, a staple also attached to parts of the automobile adapted to pass through said slot in the latch when in locking position, means for locking the latch to said staple, and a bracket secured to parts of the automobile above the latch adapted to pass through the slot therein when elevated for supporting the locking latch in vertical position.

2. A locking means for automobiles, comprising a locking latch having an upwardly bowed portion between its ends adapted to fit over the foot lever of an automobile and hold said lever against operation, said latch having a slot in one end thereof, a plate to which said locking latch is pivoted, securing means for said plate so positioned as to be covered by the latch when the latch is in locked position, a staple for engagement with the slot in the opposite end of the latch, securing means for said staple positioned to be covered by the latch when in locked position, means for locking the latch in engagement with the staple, and a bracket adapted to enter the slot in the latch when in unlocked position and hold the latch in vertical elevation.

In witness whereof, I have hereunto set my hand and seal at Newcastle, Indiana, this 22nd day of September, A. D. nineteen hundred and twenty.

FRANK STANLEY. [L. S.]

Witnesses:
D. C. Fisher,
W. H. Lawson.